United States Patent [19]

Watson et al.

[11] Patent Number: 4,902,469
[45] Date of Patent: Feb. 20, 1990

[54] STATUS TREE MONITORING AND DISPLAY SYSTEM

[75] Inventors: Craig D. Watson, Monroeville; Mary C. Eastman, Pittsburgh; David D. Woods, Murrysville; John P. Carrera, Greensburg; James R. Easter, Pittsburgh; Melvin H. Lipner, Monroeville; William C. Elm, Monroeville; A. Dean Mundy, Gibsonia, all of Pa.

[73] Assignee: Westinghouse Electric Corp., Pittsburgh, Pa.

[21] Appl. No.: 217,117

[22] Filed: Jul. 7, 1988

Related U.S. Application Data

[63] Continuation of Ser. No. 859,406, May 5, 1986, abandoned.

[51] Int. Cl.$^4$ .............................................. G21C 17/00
[52] U.S. Cl. .................... 376/259; 376/216; 376/217; 364/525
[58] Field of Search ............... 364/188, 521, 522, 525; 376/216, 217, 245, 248, 259

[56] References Cited

U.S. PATENT DOCUMENTS

| | | | |
|---|---|---|---|
| 4,482,519 | 11/1984 | Ball et al. | 376/216 |
| 4,552,718 | 11/1985 | Impink, Jr. et al. | 376/216 |
| 4,570,217 | 2/1986 | Allen et al. | 364/188 |
| 4,608,223 | 8/1986 | Twilley, Jr. | 376/216 |
| 4,632,802 | 12/1986 | Herbst et al. | 376/216 |
| 4,675,147 | 6/1987 | Schaefer et al. | 376/245 |
| 4,815,014 | 3/1989 | Lipner et al. | 376/216 |
| 4,816,208 | 3/1989 | Woods et al. | 376/216 |

Primary Examiner—Salvatore Cangialosi

[57] ABSTRACT

A display, a display method and an apparatus are disclosed which produce a summary display depicting function states using discrete state bars centered in one window of a two-window display. The status bars represent the states of functions in a process as determined by status decision trees. The discrete states are emphasized by reference lines which indicate the state of each function. Priority among functions is indicated by vertically ranking the bars with the most important function bar appearing at the top. Each bar includes the name of the function, the state of the function and a procedure name for a procedure which can be used to solve the problem identified. The discrete function state is also indicated by the width of the bar and the bar color. On both sides of each bar, a data quality indicator can appear when the quality of the data is less than the best. The other window on the summary display includes meters for the parameters along the active path of the status tree for the most relevant function as determined by the operator.

26 Claims, 19 Drawing Sheets

STATUS TREE MONITORING AND DISPLAY SYSTEM

This is a continuation of application Ser. No. 859,406 filed May, 5, 1986, now abandoned.

BACKGROUND OF THE INVENTION

1. Field of the Invention

The present invention relates to a method, an apparatus and a display used for monitoring the operation of complex process control systems such as those used in nuclear power plants, and, more particularly, to a display which summarizes the status of functions or processes in the complex system in a manner which allows the operator to easily identify which processes require attention in the order in which attention should be given and at the same time monitor desired system parameters at a more detailed level to anticipate changes in status.

2. Description of the Related Art

Modern process control systems being installed in complex plants such as nuclear power plants do an excellent job of automatically or semiautomatically controlling a complex process within preset parameters even when there are disturbances in the plants. These control systems are capable of terminating the process when an emergency occurs; however, it is still desirable, and required in many situations, that a human operator make control decisions especially in emergency situations. It is possible for the modern automatic process control system to shut a plant down when an emergency occurs; however, human intervention may be able to solve a particular problem without plant shutdown if the problem is identified early enough in a degenerating situation.

In many complex processes, the operator is confronted with a vast amount of information that must be analyzed before appropriate action can be taken. In attempting to filter out unnecessary information and provide the operator with information appropriate to the problem, several different monitoring and display systems have been created. One such type is a status tree display system which illustrates the state of the process using a decision tree. A decision tree is a tool which defines a problem in terms of various combinations of parameters states which can occur. The parameters are analyzed sequentially with the active path through the tree being determined by the states of the parameters being assessed. An example of such a monitoring and display system is illustrated in U.S. Pat. No. 4,552,718 by Impink, Jr. et al.

Various methods of summarizing the results of status tree analysis have been proposed including what is called a status tree bar chart 8 which depicts the state of the functions being monitored, as illustrated in FIG. 1. This proposed status tree bar chart aligns one end of the bars on one side of a display and uses both color and words to identify functions and the degree or nature of the goal dissatisfaction by a particular process function. That is, words are used to name the function and describe the state whenever the function is not in a satisfactory state. The alignment gives the impression of continuous bars as well as the measurement of something with respect to a reference point. Since reference measurement points are not appropriate in such status displays, this aspect of the proposed display causes considerable confusion. The order of the bars on the proposed display of FIG. 1 is arbitrary and the functions which are in a satisfactory state are merely identified by an existing bar without words indicating which bar corresponds to which function. The proposed display requires the operator to memorize the location of each bar.

SUMMARY OF THE INVENTION

It is an object of the present invention to provide a display that identifies each function at all times, indicates discrete function states by summary status bar width, color and wording and clearly indicates a discrete state display.

It is another object of the present invention to order the function status bars by priority allowing state ties to be resolved by vertical priority and to associate with each state a procedure for solving the problem.

It is a further object of the present invention to indicate the quality of data used to determine the state in association with each state bar thereby providing a confidence level indicator for the system state display.

It is an additional object of the present invention to provide, on the same display as the summary status bars, meter images of the parameters for operator selected functions associated with the active path in the decision tree used to produce the associate status bar to allow the operator to anticipate changes in status.

It is still another object of the present invention to indicate the state ranges on the meters as well as data quality.

It is still a further object of the present invention to provide a second level status tree display accessible through cursor poke points which displays the status tree for the associated function and highlights the active path so that the operators can review the decision making process producing the current function state.

It is still another object of the present invention to provide a second level status tree display which indicates parameter values as well as data quality.

It is also an object of the present invention to also provide a second level display which will allow the operator to continue to monitor the summary display using a miniature version of the summary status bar display depicted on the second level display.

It is a further object of the present invention to provide a poke point cursor accessible third level display which allows the operator to look at the individual sensor values which are used in the computations as well as to continue to monitor the summary status bar display via the miniature version thereof.

It is an object of the present invention to provide a system of displays which allows an operator to confirm the validity of decisions as to process control system state made by the system.

The above objects can be attained by a display, a display method and an apparatus which produce a summary display which depicts function states using discrete state status bars centered in one window of a two-window display. The discrete states are emphasized by the centering of the status bars as well as by reference lines which indicate the state of each function. Priority among functions is indicated by vertically ranking the bars with the most important function appearing as the top bar. Each bar includes the name of the function, the state of the function and a procedure name for a procedure which can be used to solve the problem associated with the current state. The discrete function state is also indicated by the width of the bar and the bar color. On both sides of each bar, a data quality indicator appears when the quality of the data used to determine the current state is less than the best.

The other window on the summary display includes meters for parameters used to calculate the current state along the active path of the status tree for the most relevant function as determined by the operator. Each meter indicates not only the current value of an active path parameter but also the ranges of the different function states as they correspond to the parameter being displayed by the meter. The meters also carry the data quality indicator.

A poke point/cursor accessible second level display is provided which depicts the status tree with the active path highlighted allowing the operator to review the decision process made by the status tree in determining the current state of a selected function. The second level display also indicates the values of the parameters used in the decision-making process. The second level display further includes a miniature version of the summary bar portion of the highest level display that allows the operator to continuously monitor the system summary status while reviewing the second level display.

A third level display, also poke point/cursor accessible, is provided which depicts detailed information on the sensor values of the parameters being monitored as well as the exact question being answered by the process control monitoring system for a desired portion of a function. This third level display also includes a miniature version of the summary status bars.

These together with other objects and advantages which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENT

The present invention can be used for various types of complex nonlinear process control systems such as chemical plants, however, it will be described with reference to a nuclear generating unit.

Figure 1:
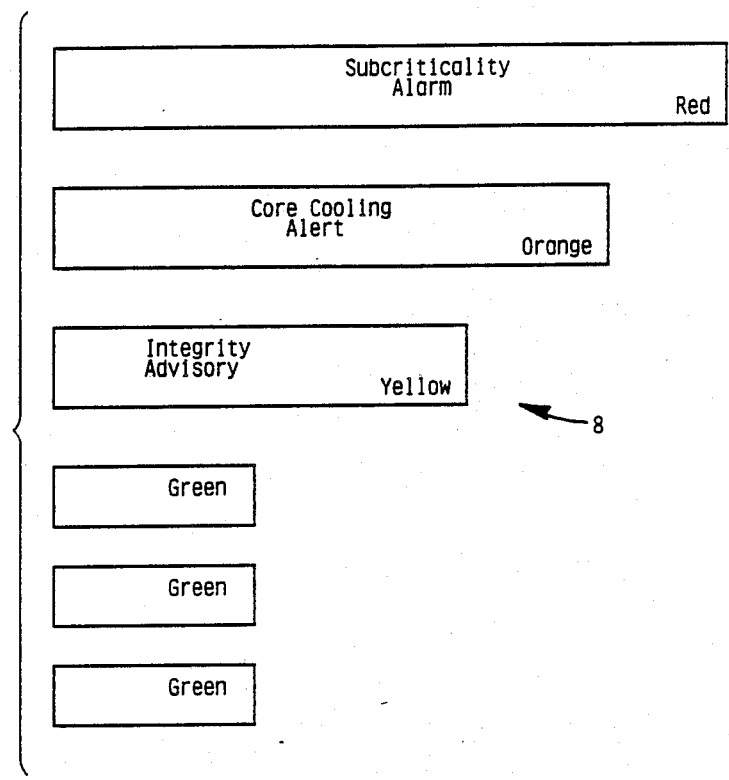
FIG. 1 depicts a prior art summary display.
Figure 2:
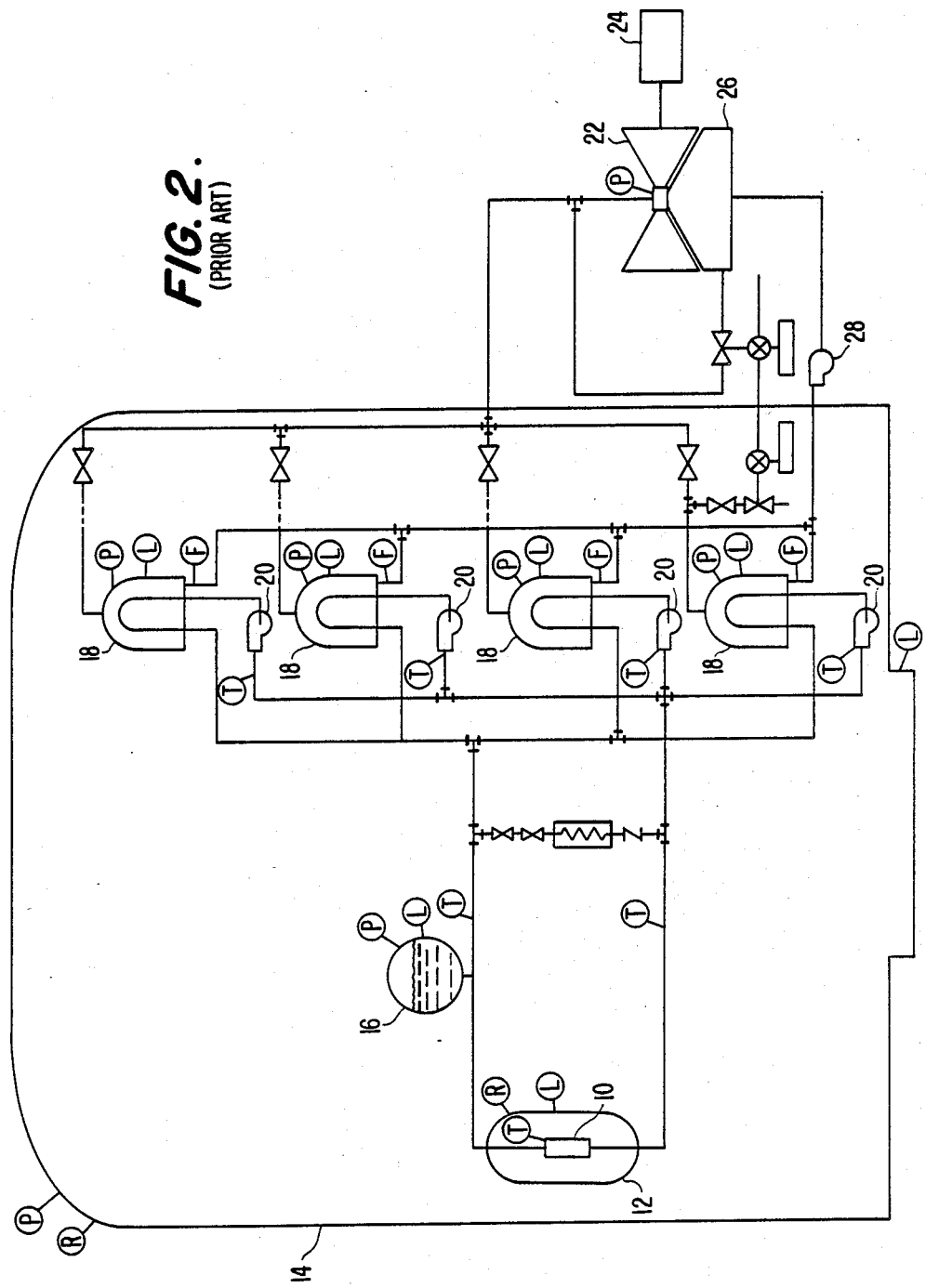
FIG. 2 is a schematic diagram of a pressurized water reactor to which the present invention can be applied.

As illustrated in FIG. 2, a nuclear generating unit includes a core 10 inside a reactor vessel 12 which is housed in a containment structure 14. A coolant heated by a nuclear reaction is circulated through pipes to steam generators 18 by pumps 20. A pressurizer 16 maintains the pressure in this primary loop. Water introduced into the steam generators 18 is converted into steam and used to drive a turbine 22 which drives an alternating current generator 24. The vitiated steam from turbine 22 is collected in condenser 26 and recirculated to the steam generators 18 by pump 28. Monitoring and control of the nuclear generating unit occurs at various points throughout the plant as indicated by the circles enclosing a letter representative of the type of reading which is taken at the particular location, in which F represents flow, L represents level, P represents pressure, R represents radiation and T represents temperature. The sensor values produced by the relevant sensors are monitored by a data acquisition system and used to produce status displays for the human plant operators.

One of the jobs of the plant operator is to monitor the status of critical safety functions of a nuclear power plant such as core cooling. In past implementations, operators have manually evaluated the status of critical safety functions by following the status trees in a sequential manner and integrating the results of all the trees in their minds. To relieve the operators of this time consuming task, many utilities are considering the automation of the status tree logic. Thus, a need has arisen for providing the operator with a summary display which not only depicts the status of the entire system but also illustrates the value of various parameters being monitored. Such a display in accordance with the present invention is illustrated in FIG. 3.

Figure 3:
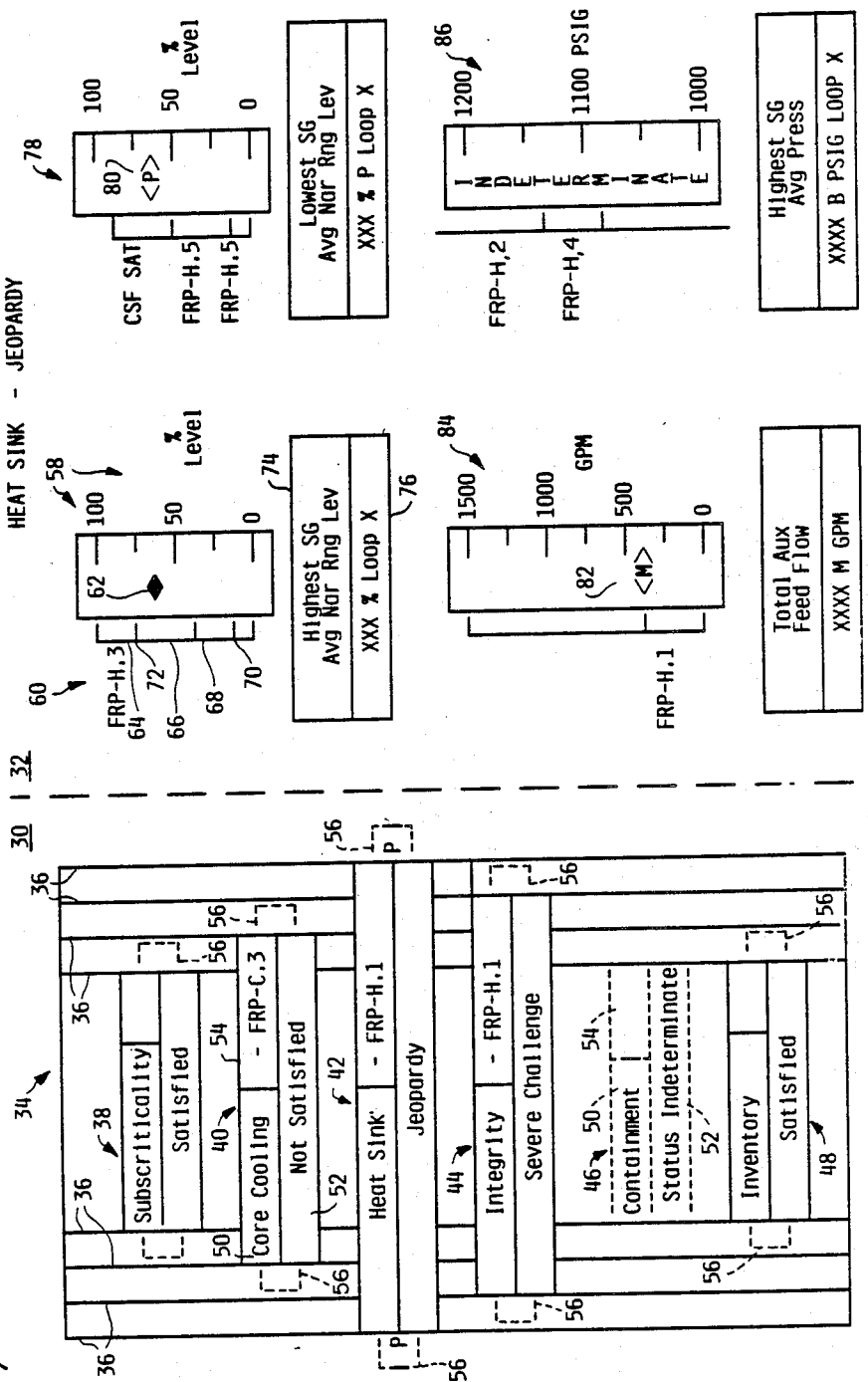
FIG. 3 illustrates a top level or summary status display in accordance with the present invention.

The summary status level display, in accordance with the present invention, as illustrated in FIG. 3, includes a left-hand window 30 which depicts the summary status of the system being monitored and a right-hand window 32 which depicts process control parameters in the active or critical path of a function state computation selected by the operator. It is also possible to have the meters associated with the active path automatically appear on the screen whenever a particular event occurs such as in a trip (automatic shutdown) of a nuclear power plant. The summary status bar display side includes two main features: (1) a state reference scale 34 which visually defines the four levels each function a parameter can occupy using reference lines 36, and (2) status bars 38-48 which depict the state or discrete parameter value of each function being monitored. Each status bar, as depicted in FIG. 3, varies in width in accordance with the function state or discrete parameter value. For example, status bar 38 indicates satisfaction of the subcriticality function, is the smallest sized bar and is green in color. Status bar 40 indicates a not satisfied core cooling function and is yellow in color. The next highest goal violation is indicated by status bar 44 which indicates a severe challenge to integrity and is orange in color. While the highest goal violation bar is the jeopardy bar as illustrated by bar 42. Status bar 46 which has its border removed, as indicated by the dashed line, indicates that the status of containment cannot be determined because of bad or inadequate data, which will be discussed in more detail later.

As can be seen from FIG. 3, the status bars not only vary in width in accordance with the goal but also color and wording. The centering of the status bars and the vertical reference lines clearly differentiates the display as a discrete state level display in contrast to a continuous level bar graph type display. Each status bar, for example, the core cooling status bar 40 includes three regions or display fields including: (1) a function name region or field 50 in which the function name is a constant, (2) a written goal status description region or field 52 in which a description of the status of the function is written, and (3) a procedure indication region or field 54 which indicates a procedure name for a procedure which can be used to solve the problem associated with the dissatisfied goal. Both the written description region 52 and the procedure indication region 54 are variable depending upon the status of the particular function.

Whenever the data used by the process control monitoring system is so bad or in error that it is impossible for the status determination algorithms to compute a status, a status bar as illustrated by status bar 46 is displayed in the left window 30 of the top level display of FIG. 3. The status bar has its outline color removed and the wording "status indeterminate" is substituted in the state description region 52. This type bar is displayed, for example, when all the sensors necessary to determine whether the containment is operating properly are malfunctioning.

Associated with each status bar is a data quality indication region 56 as particularly illustrated along side heat sink status bar 42. The poor "P" data quality indication region or indicator 56 for the heat sink bar indicates that the computation for determining heat sink function status can be made even though all the sensors associated with determining the function are not operating properly. For example, if two out of three sensors for one portion of the heat sink function are not properly operating and the system performs calculations based on the highest value among the three sensors, then the data quality is poor since the value of one sensor cannot be determined. The data quality computations will be discussed in more detail hereinafter.

As discussed above the summary status bar display of window 30 takes advantage of the natural stereotype of importance associated with larger objects are more important than smaller objects and items near the top of a stack are more important than items near the bottom resulting in a display with two dimensions of priority. A display taking advantage of these natural stereotypes is a more informative display.

The right-side window 32 on the top level display of FIG. 3 is used to display parameter meters indicating the values of parameters used to determine function status which the operator wants to monitor more closely. The meters are selected by activating a cursor poke point associated with the status bar of interest. By putting the selectable meters on the right-hand side of the display, the visual image again takes advantage of a natural stereotype where people read from left to right, that is the most important display, the summary status bar display, is read first when confronted with the combined display. Each meter corresponds to one or more decision points in the status tree associated with the active path or critical path of the function being monitored, that is, all the meters associated with the status tree are not shown, only the active path parameter meters. The number of meters displayed can range from one to six for the Westinghouse owner's Group Critical Safety Function Status Trees depending on the corresponding status tree and, of course, the number would vary if the present invention is applied to a different process.

Each meter includes a meter background or template 58 which includes the outline of the meter, the meter ranges and the range description. For example, meter 60 has a range of from 0 to 100 for percent level of the highest steam generator average level set forth on scale 61. Inside each meter template is an actual value indicator 62 which indicates the current value of the parameter monitored within the range indicated on the right side of the meter. A diamond shaped indicator 62 is preferred because it indicates that the value corresponds to both sides of the meter and when the indicator reaches the bottom of the meter the indicator does not disappear as would occur if a line or bar were used as the indicator 62. To the left of the meter are colored brackets 64–72 which indicate the range of the various status levels associated with the parameter being monitored. In meter 58 four ranges are indicated. The top range 64 indicates the jeopardy level and is yellow in color the next lower range 66 can indicate the not satisfied range and would be yellow in color or the satisfied range and be green in color. Between the two highest ranges 64 and 66 is a threshold indicator 72 that depicts the point at which the status of the function will change in dependence upon the particular parameter being monitored. The third level bracket 68 and the bottom level 70 can be the jeopardy (red), not satisfied (yellow) or the satisfied range (green). The color chosen depends on the remaining values at the tree nodes. The bottom range 68 can belong to range 66 or 70 depending on which set point is currently applicable, 6% or 34%. However, a meter could include brackets for all the colors in the system that indicate determined states. Between all the ranges are the threshold change indicators. Each of the colored status range brackets associated with the meters can change in range or size because status is determined in accordance with many parameters and as a result the threshold points between ranges will also move up or down depending on how the particular parameter being monitored is affected and affects other parameters.

Below each meter in FIG. 3, for example, meter 58, is a constant description region 74 which describes the parameter being monitored by the associated meter 58. Below the description is a digital read-out region 76 indicating not only the actual parameter value but also the particular equipment being monitored, when more than one piece of equipment can be used to obtain the monitored parameter, for example, steam generator loop X.

Meter 78 has the same features as meter 58, however, the actual level indicator 80 in meter 78 indicates that the data quality of the measured parameter is poor. In addition to the poor and indeterminate or bad data quality indicators a manual indicator 82 as illustrated in meter 84 can be used. This indicator is produced both on the meters and in the summary display of window 30 whenever the operators have entered a manual value for the sensor values used to compute the parameter value. The manual indicator 82 indicates to the operator that the sensor values for this parameter must be updated manually before the reliability of this meter can be accurately determined. For example, when the sensor values for water level in pressurizer 16 of FIG. 2 cannot be determined by the sensors because of some malfunction, the operator may be able to telephone the plant and receive a visually determined level value from a plant technician. The operator then can enter this manual value into the status tree calculations and obtain a status calculation for inventory, even when the sensors associated with measuring inventory are malfunctioning. Meter 86 depicts a meter in which the parameter being monitored cannot be determined because of, for example, bad data. In this meter the word indeterminate is written in place of the indicator. In addition, it is also possible to change the bracket to a color such as magenta to also indicate bad data. Meter 86 also illustrates a meter for which the entire parameter range is not relevant for the application and, thus, only the relevant portion is presented.

The combination of the summary status window 30 with the meter window 32 provides a more powerful display to the operator which allows the operator not only to monitor the overall status of the system but to also monitor in detail the parameters that affect the active decision tree path or current state of a selected function. Such a display provides the operator with much more information than either the summary display alone or the meter display alone as well as much more information than the display of a status tree alone. For example, in an active version of FIG. 3, the operator can monitor the highest steam generator average level (meter 60) for the heat sink function (status bar 42) and determine that some progress is being made in correcting a heat sink problem by visually watching the movement of the actual level indicator 62. Thus, as the indicator moves up or down within the meter 60, the operator can determine rapidly whether his efforts are solving the problem as depicted by the position of the pointers 62 with respect to the range brackets (64–70) as well as continue to monitor the status of other critical safety functions within the plant using the summary status bar display window 30.

Figure 4A:
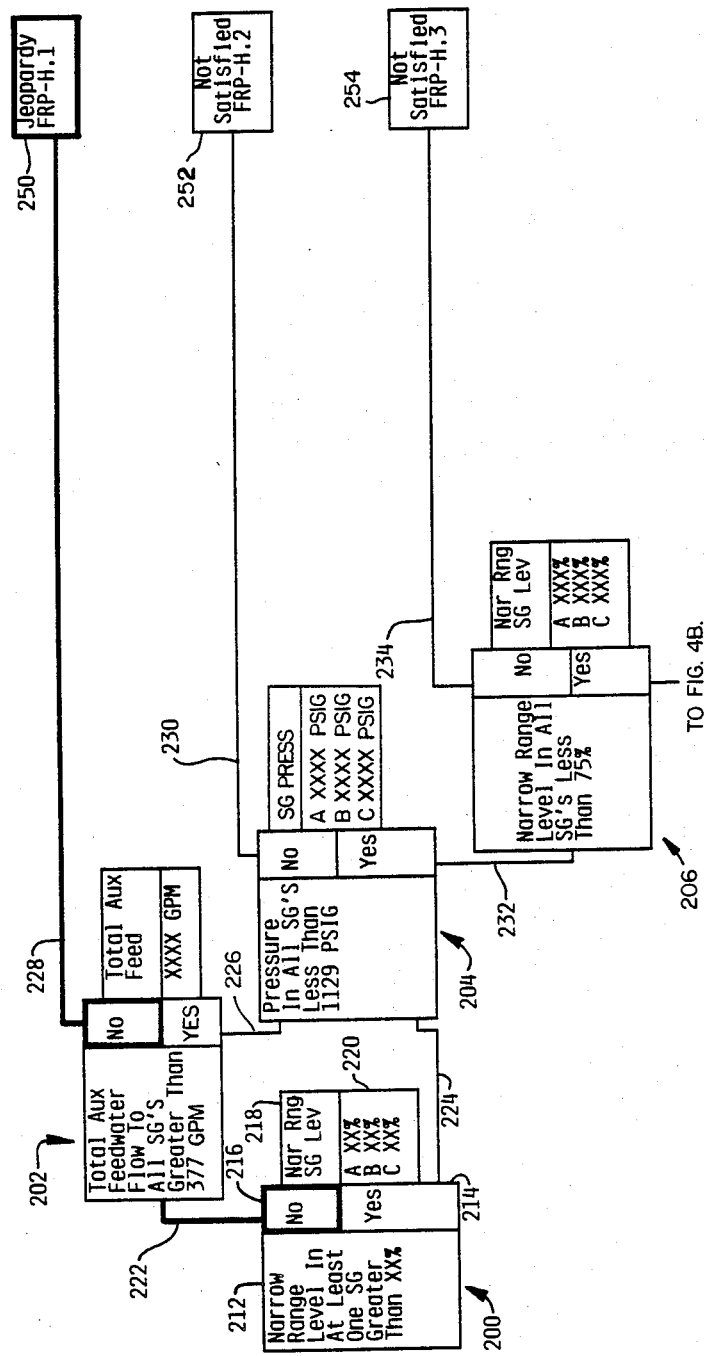
FIGS. 4A and 4B illustrate a second level status tree display in accordance with the present invention.
Figure 4B:
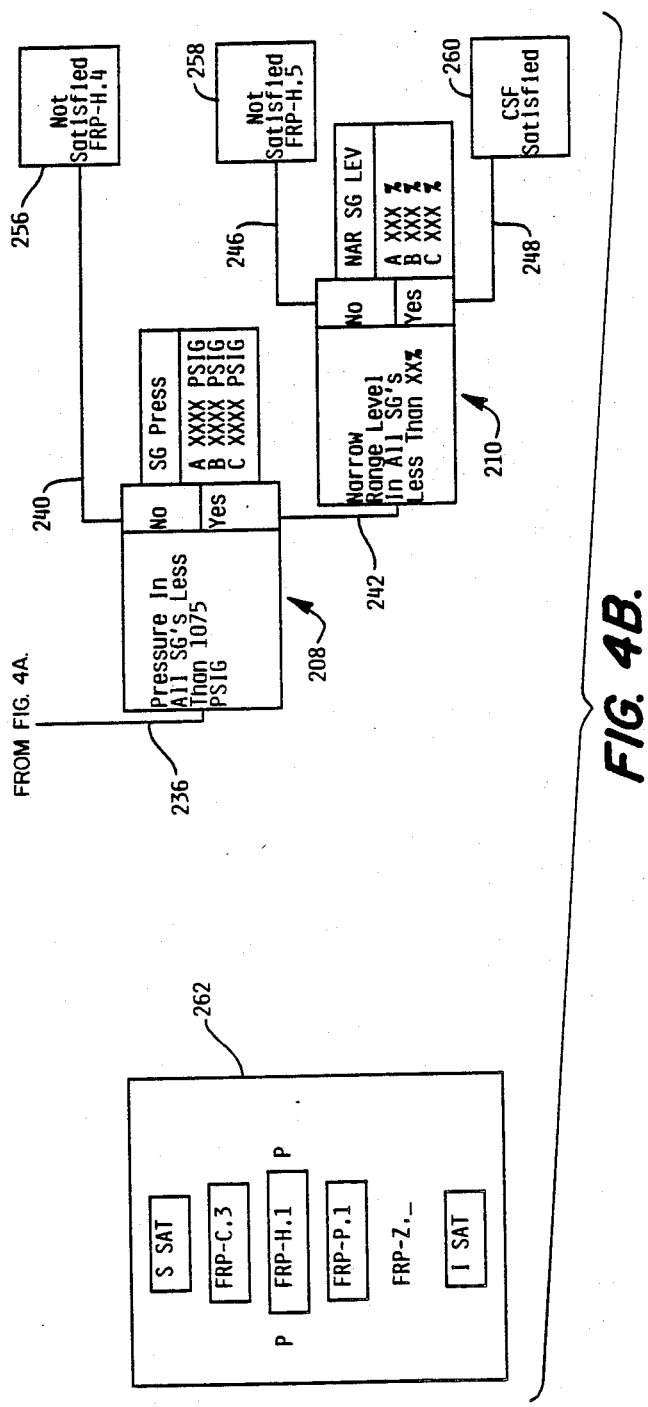

If the operator needs to review the status tree associated with, for example, the heat sink function, the operator can activate a cursor poke point on the display of FIG. 3 and an actual active status tree diagram such as illustrated in FIG. 4 for the heat sink function will be displayed. The status tree includes all of the decision tree (binary decision points) and branches as well as the questions used to determine the status of the particular function. For example, the status tree for heat sink includes six decision nodes 200–210. Each decision node, for example decision node 200, includes a question region or field 212 which depicts the fixed question being asked about the parameter being monitored. Also included in the node are answer fields 214 and 216 of which the particular binary answer at the decision node is highlighted by showing the answer in reverse video. Also included is fixed wording description region or field 218 along with a variable parameter value region 220. The provision of the value region 220 allows the operator to verify the answer to the question and attain incite as to the reason for the highlighted answer.

The connections between the decision nodes are illustrated by branch lines 222–248. As can be seen by the status tree depicted in FIG. 4, the active path or critical path of the decision tree is highlighted by thickening the line. It is possible, of course, to provide a color highlighted line for the active path. The remaining branches are merely indicated by non-highlighted branches. Located at the end of the last branch 228 in the active path is a termination node highlighted box 250 surrounding a status description and a procedure name which should be followed to solve the problem associated with the active state. The remaining termination nodes 252–260 are not highlighted. The decision tree can be used by the operator to investigate which parameter, if changed, will have the greatest effects on the current state of the function. However, typically the meter display would be used for the investigation function and the decision tree to confirm state logic.

In one corner of the second level status tree display is a miniature version 260 of the summary status bar display of FIG. 3. This display is substantially identical to the larger summary status bar display in that the relative sizes of the status bars are maintained along with the data quality indications. However, the wording in each bar indicating an unsatisfied goal only sets forth the procedure that should be followed to solve the particular problem, that is, the function name and state wording are absent. The provision of the miniature display 262 all on the second level status tree displays allows the operator to continue to monitor the overall system status while investigating a particular problem. For example, when the operator examines the second level display of FIG. 4, the operator can determine that the jeopardy state can be changed to the not satisfied state by increasing the total auxiliary feed water flow to all the steam generators to greater than 377 gallons per minute or by forcing the narrow range level of at least one steam generator to be greater than a certain percentage value while also monitoring system status.

Figure 5:
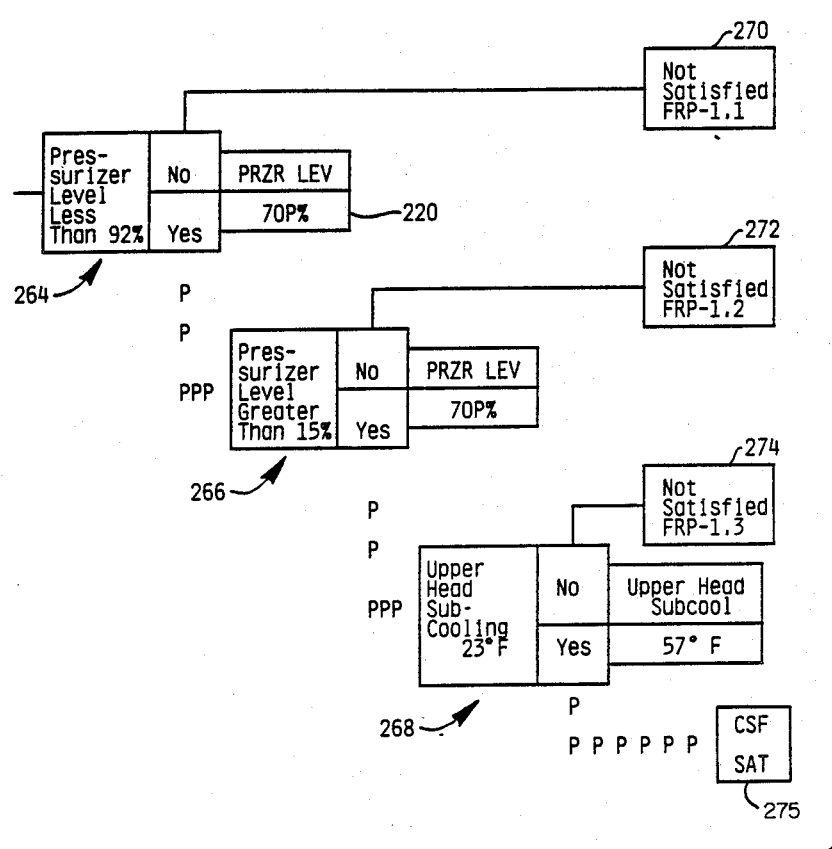
FIGS. 5 and 6 illustrate the status tree of FIG. 4 including data quality indicators.
Figure 6:
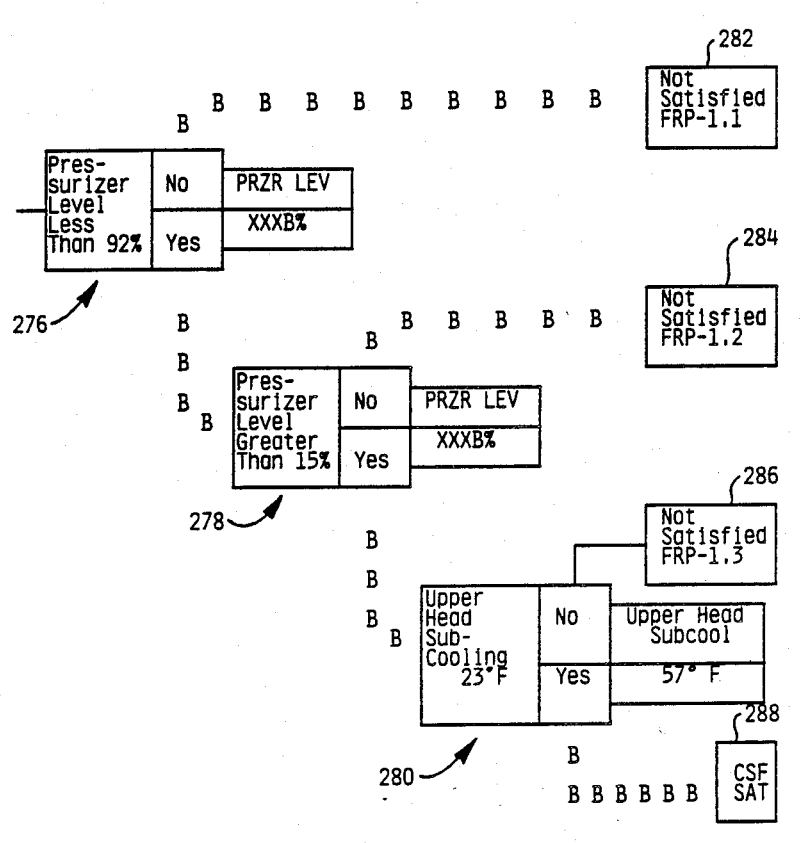

When the data quality of a particular parameter is not the best, the decision tree will depict poor data quality as illustrated in FIG. 5. By following the "P" code branches, in this example node 264, the particular parameter values in error or out of range can be located. The poor parameter values are indicated by a data quality indicator "P" associated with the value in the parameter value region 220. This will allow the operator to visually determine which sensors should be addressed by maintenance personnel to improve data quality. If manual data had been substituted for an actual sensor value, the "P" lines of FIG. 5 would be replaced by "M" lines. FIG. 6 illustrates an example of a display when bad data is encountered by the status tree computation routines.

Figure 7:
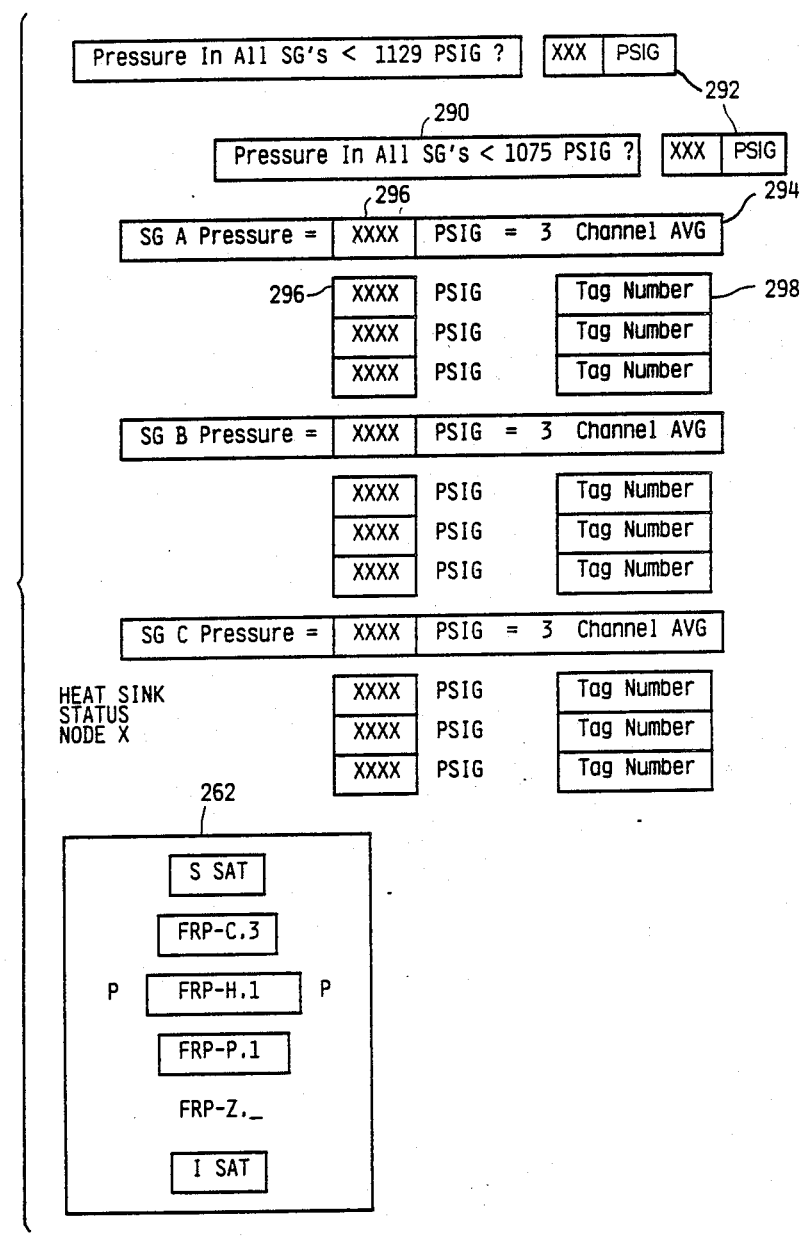
FIG. 7 depicts a third level parameter display in accordance with the present invention.

If the operator needs to examine the sensor values which go into a particular decision tree node or parameter computation, the operator can poke point access a third-level display as illustrated in FIG. 7. This display includes fixed question fields 290 displaying the question of the node being investigated along with answer fields 292 corresponding to each question. In addition, also included are representations of the actual calculation used to determine the actual value. For example, in FIG. 7, the steam generator A pressure equation representation 294 indicates that steam generator A pressure is a three-channel average. Within this representation region 294 is the actual computed value 296. Underneath the equation representation are actual sensor value representation fields 296 for the actual values of sensor pressure for steam generator A pressure. To the right of the sensor value fields are fixed wording tag fields 298 which provide an identification number for the particular sensor being monitored. If the sensor is malfunctioning, X's are substituted for the appropriate actual values on this display. In general, other calculations for other parameters and decision nodes in a system such as a nuclear power plant monitoring system are as simple as the equations represented in FIG. 7.

As can be seen on the lower left-hand side of FIG. 7, the miniature version 262 of the status bar display of FIG. 3 reappears on this third-level display. The reproduction of the miniature version of the status bar display allows the operator to continue to monitor overall system status as he investigates a particular problem, thereby providing the benefits of a summary system display throughout problem investigation.

The combination of displays discussed above allows the operator to continuously monitor system status using a display having the priority of the various critical functions indicated by the order of the display status bars and the discrete states of each function status indicated not only by color and wording but also by reference lines. While the particular procedure that can be used to solve the problem is carried with the displays as the operator digs more deeply into the system to solve a particular problem. That is, the present invention provides a display with substantially more information available to the operator while maintaining the high-level summary type display providing substantial benefits over prior art displays when solving critical problems.

Figure 8:
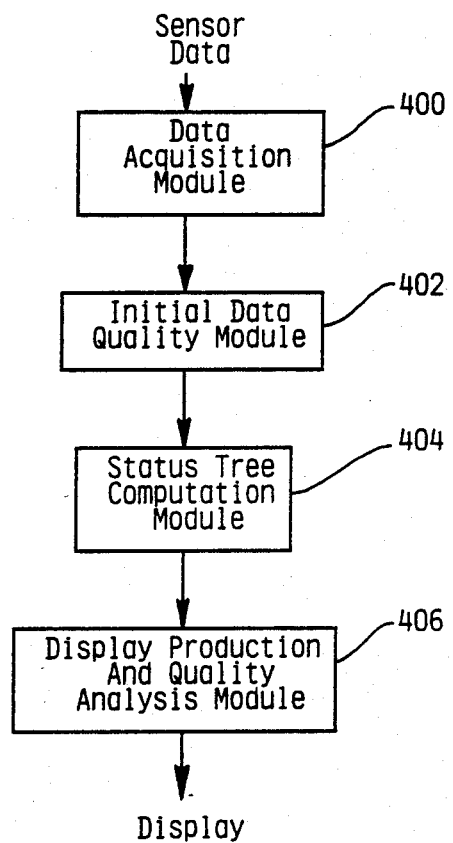
FIG. 8 illustrates software modules for producing the displays in accordance with the present invention.

FIG. 8 depicts the conceptual division of the software of the present invention into various modules. Of course, depending on the size of the computer and cycle time for the displays, these modules could be combined into larger modules or subdivided into even smaller modules. The first module 400 represents the data acquisition software which is used to read sensor values and store these values in a centralized dynamic data base. The data acquisition software can be provided by one of ordinary skill in the art or purchased from a vendor such as Digital Equipment, Inc. The programming language for the data acquisition module is preferably an assembly language since a real time data sampling task is involved.

The design of the initial data quality module 402 is also within the ordinary skill in the art. This module does simple computations to determine the initial quality of the data gathered by the data acquisition module. For example, if a particular sensor among triply redundant sensors is malfunctioning, the initial data quality module will tag the data block containing the inoperative sensor value with an indicator indicating that the data is of questionable quality. Another example is if a particular sensor value is out of an acceptable range, the sensor value field will be tagged with a bad quality indicator. The quality determination module 402 will compare the sensor value with the range and if out of range add a bad data tag. The particular data quality computations or algorithms are dependent on the type of system being monitored and the redundancy of the sensors in the monitoring system. A preferred language for such computations would be an assembly language which would allow quick data quality checks.

The third module 404 is the status tree computation module. This module can be programmed in a language such as Fortran from a flowchart as illustrated in FIG. 8 to be discussed in more detail later. One of ordinary skill in the art could provide these hardcoded procedures as discussed in detail in U.S. Pat. No. 4,552,718 previously mentioned and incorporated by reference herein. However, as more sophisticated rule-based or artificial intelligence type analysis systems are integrated into process control systems, the application of such inference software as the status tree computation module would be appropriate. This approach would increase the flexibility of the system in adapting to additional new or critical functions.

The display production module 406 is a procedure which actually produces the display and uses, for example, overlay techniques. The display creation procedures will be discussed in more detail later; however, well known procedures such as the performing a byte transfer overlay or a cursor poke point acknowledgement will not be discussed in detail since one of ordinary skill in the art can provide the details of such procedures.

Figure 9A:
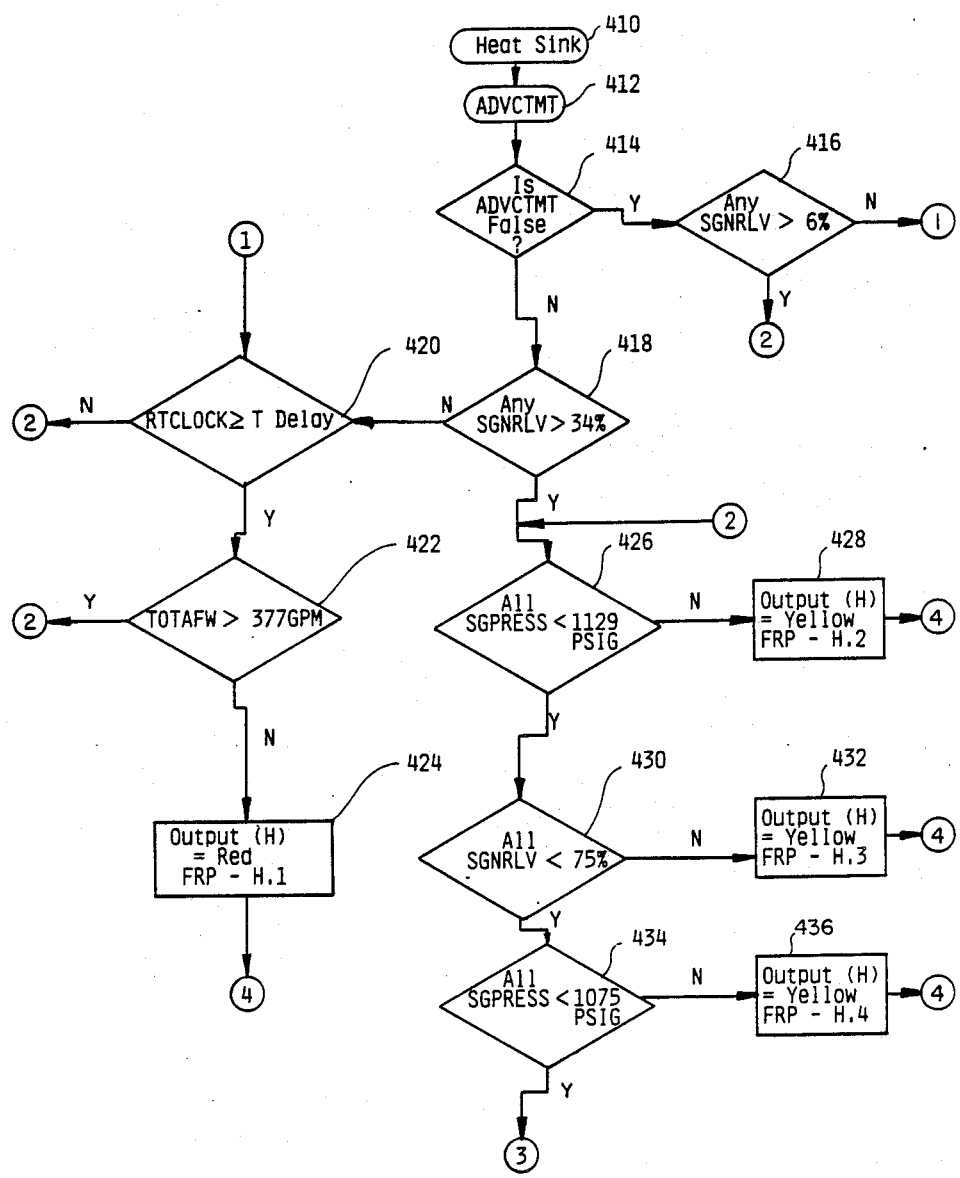
FIGS. 9A and 9B illustrate one example of a status tree computation program.
Figure 9B:
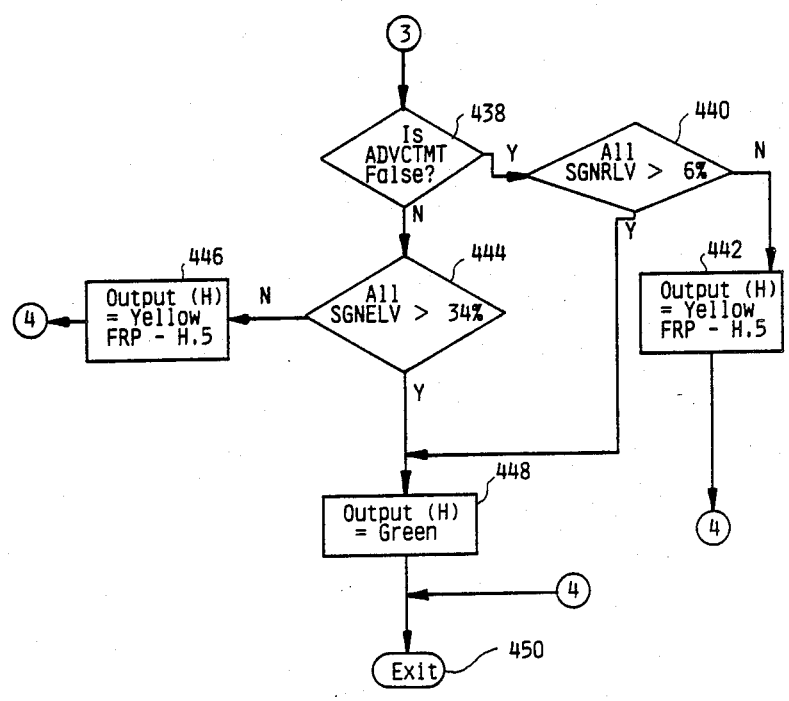

FIG. 9 depicts a typical flowchart for a critical function status computation and is the flowchart for the heat sink computations illustrated in FIG. 4. Symbol 412 represents the calculation of a logical parameter ADVCTMT which is the determining factor for using either 6% or 34% as the setpoint for decision nodes 200 and 210 in FIG. 4. The details of this calculation are with the ordinary skill the art. A comparison of this flowchart with FIG. 4 indicates that the decision steps in the software parallel the decision steps of the status tree thereby making the conversion of status trees into appropriate status tree analysis software very simple. At each decision level, for example, decision block 418, a branch is taken which corresponds to a decision node in the status tree, in this example corresponding to decision node 200 in FIG. 4. Block 420 represents a time delay which allows the auxiliary feedwater pumps to start up completely before decision node 204 in FIG. 4 is evaluated. Without this time delay, an operator would be immediately directed to procedure FRP-H.1 as indicated by the red status of endpoint 250 in FIG. 4. The multiple path branch of FIG. 4 which allows both answers to node 200 to follow a path through to node 204 is illustrated by the branch pointer "2" in FIG. 8 which joins blocks 422 and 426. As can be seen by the output blocks, for example 428, the output equals the output color as well as the procedure name. The color represents the status when mentioned in later discussed flowcharts.

To produce the displays of the present invention, one method involves loading a display background into a display generator memory using a well-known byte transfer technique and overlaying the background each time the display changes also using a byte transfer technique. For example, if the memory address of the beginning of a fixed text field in the generator memory is known the text could be transferred to the memory while writing over the contents of each memory location following the known address. Such overlay techniques are well known in the display creation art. There are other methods of creating such displays such as line-by-line creation methods, however, the overlay method, even though it consumes larger amounts of memory, is generally faster and is preferred for real time systems, such as in a nuclear power plant. In the discussion below, whenever the loading of a background display or the overlay of a particular portion of a display is indicated, one of the well-known overlay procedures is used to load the appropriate portions of a display generator memory.

Figure 10:
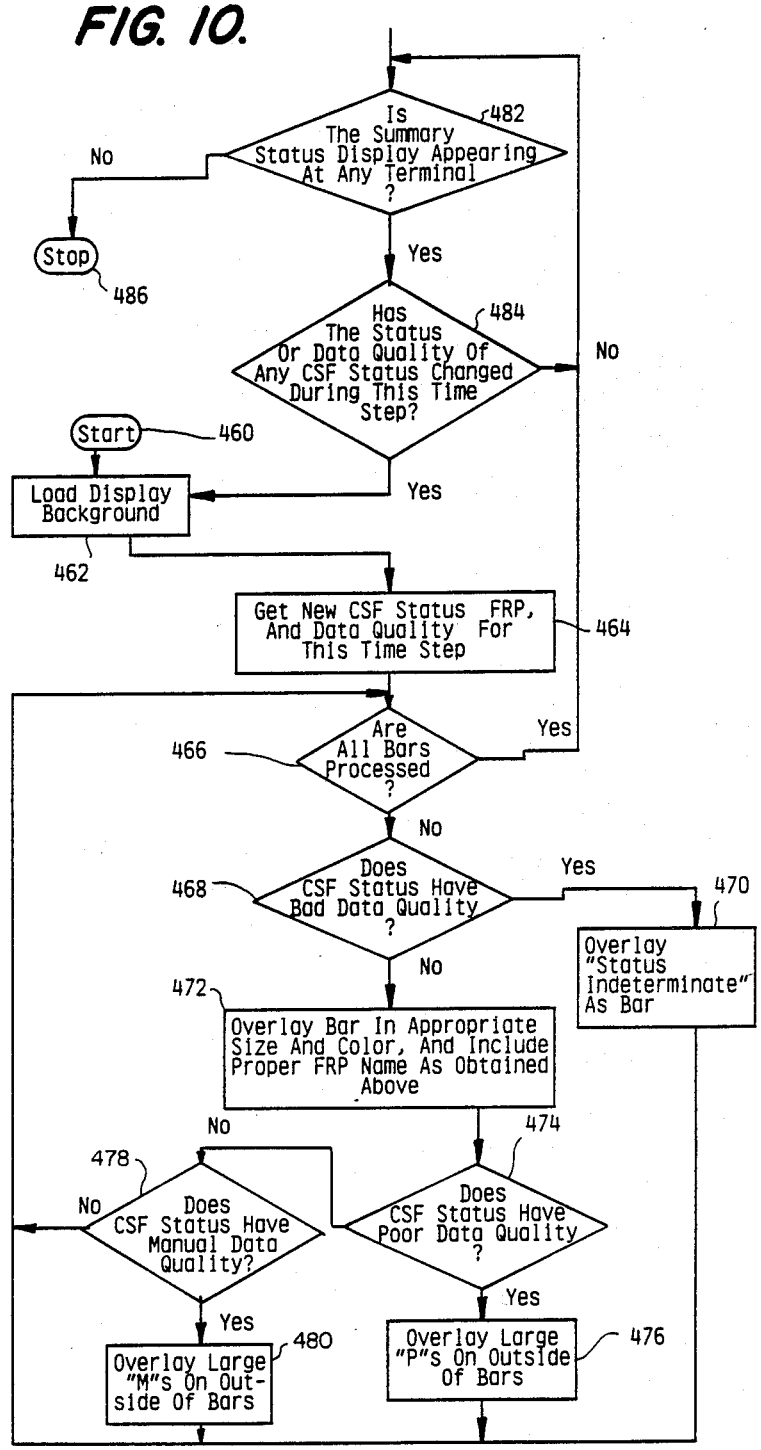
FIG. 10 is a flowchart of the display generator software which produces the status summary bars.

FIG. 10 illustrates the flowchart of the procedure for creating the summary status bar display of FIG. 3. The software represented by FIG. 10 can be executed continuously or cyclically as determined by the refresh or scan cycle for the data acquisition module. The load display background step 462 loads the fixed wording regions 50 of the status bar as well as the reference lines 36 for the display into the display generator. The critical safety function status, the procedure numbers and data quality for all the functions are retrieved in step 464 from a memory associated with the previously executed modules or from, for example, a common or global data base. If all the bars have not been processed 466, a determination is made 468 as to whether or not the data quality is bad. If the data quality is bad, the word status indeterminate is overlaid 470 in place of the bar. It is also possible to create a border for a bad data quality bar having a color such as magenta which would indicate bad data by including an appropriate overlay at this step.

If the data quality is not bad, the appropriate size bar, color and procedure name are overlaid 472 in the appropriate location in display generator memory. If the data quality associated with this particular critical safety function is poor the appropriate indicator "P" is overlaid 476 in the appropriate data quality indicator region 56 for the respective bar. Similar steps are performed 478 and 480 for the manual data quality indicator. When all bars have been processed, the system can move into a wait state in which the procedure determines whether a status display is appearing 482 at any terminal. If the status or data quality has changed 484 for an active status bar display, the display background is again loaded to clear the display, of for example an oversized bar, and the process of creating the bars is again executed.

The process for creating the miniature display associated with the second and third-level displays is substantially identical to the process depicted in FIG. 10 and will not be further discussed for simplicity purposes.

Figure 11:
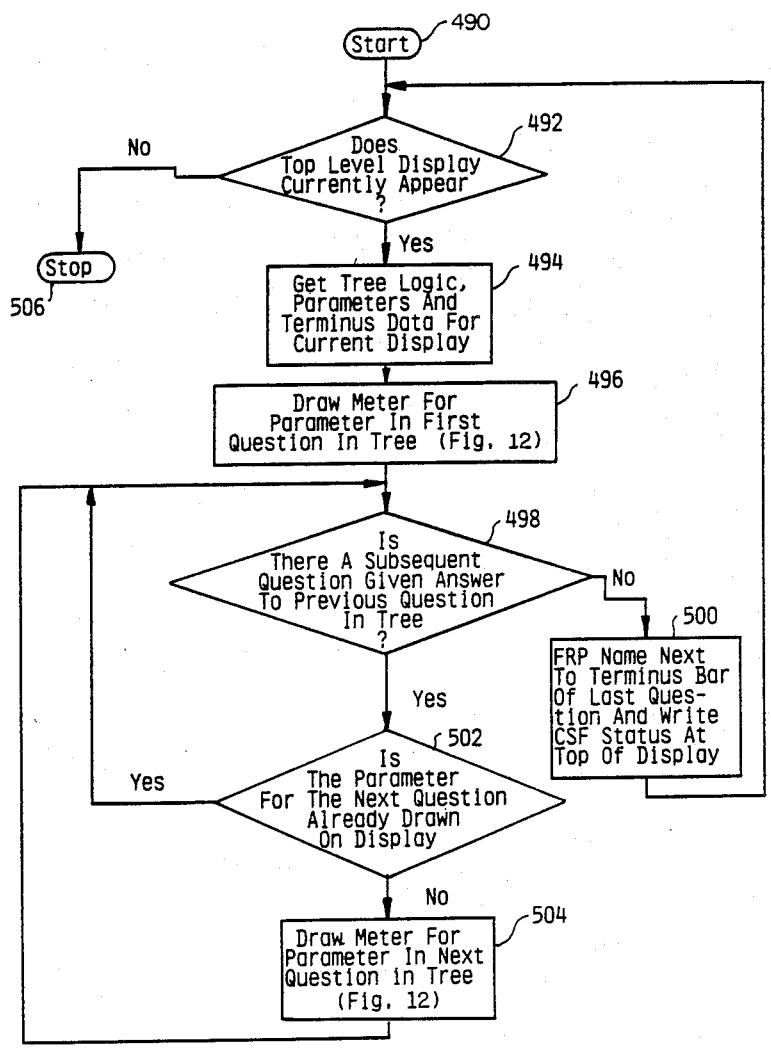
FIG. 11 is a flowchart of the meter selection software.

Depending upon the particular cursor poke point activated by the operator, the meters for the right-hand window of FIG. 3 are selected in accordance with the flowchart of FIG. 11. This module only selects those meters associated with the corresponding status tree that are along the active path, and calls another routine (FIG. 12) that actually draws the meters, that is, as the active path in the status tree changes the meters appear and disappear in correspondence thereto. If the top level display is currently appearing 492, the tree logic for the desired display and terminal nodes 494 are retrieved.

The tree logic can be any of a number of data structures used representing the tree with the preferred structure being a linked list, that is, each record in the data structured preferably represents a node and includes the actual fixed text fields question asked or the status if a terminal node. Also included in each record is a logical representation of the question, a logical representation of the answer, the fixed test of the parameter description or procedure name, the parameter values and pointers to each subsequent record in the tree along with a node type indicator that indicates whether the record represents a terminal node or an intermediate node. Various other flags and indicators such as a set point change flag can be included in each node record as discussed hereinafter. To follow the tree logic to obtain needed field contents, the software only need to follow the pointers using the answer representation to determine which branch to follow. The tree traversal procedures are well known to those of ordinary skill in the display art.

Figure 12:
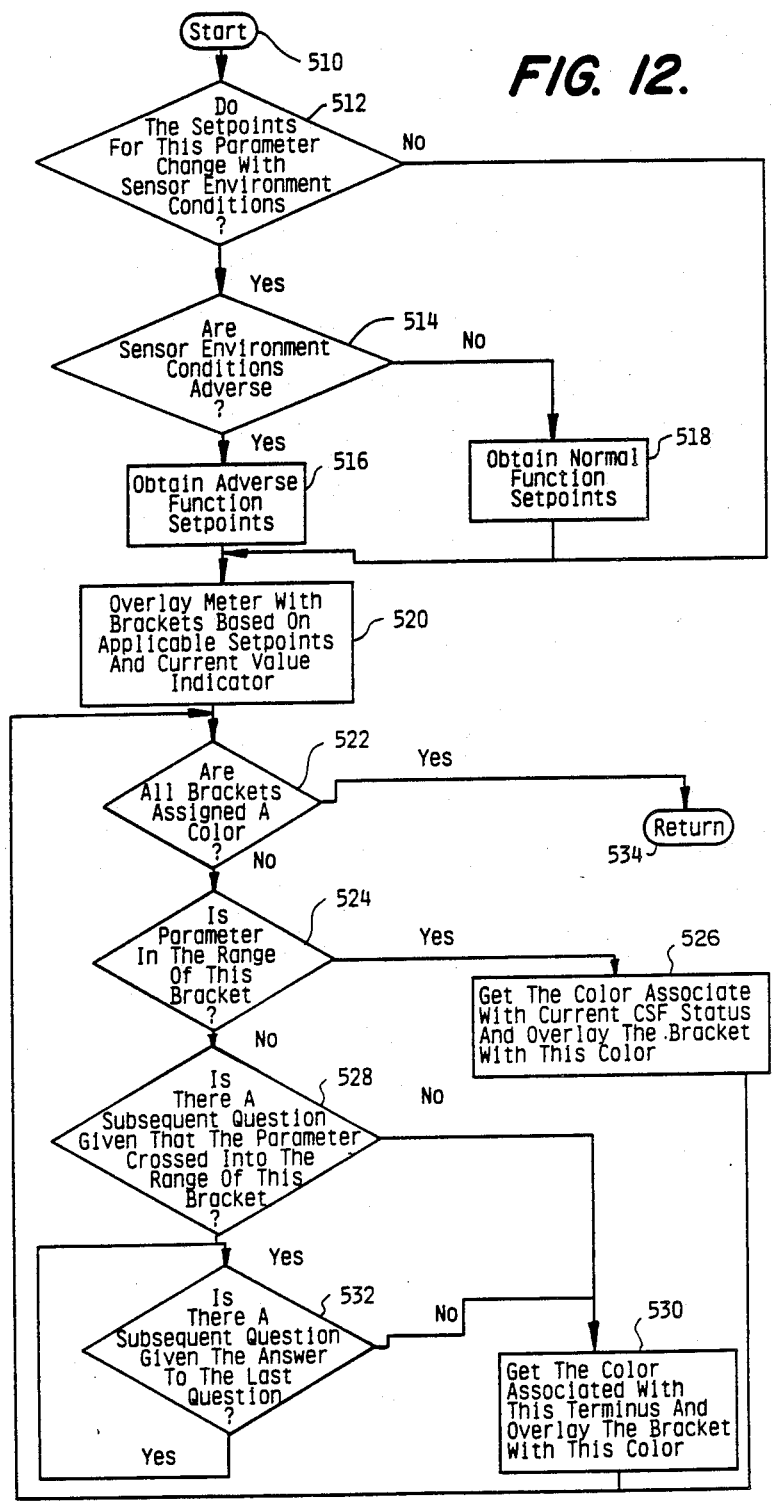
FIG. 12 is a flowchart for the procedure which draws the meters of the summary display.

Next, the appropriate meter for the parameter in the first question in the tree is drawn 496 by the procedure depicted in FIG. 12. Then, a decision is made 498 as to whether there are subsequent questions in the tree by examining the node type indicator for the current node, if there are no subsequent questions the status of the particular critical safety function is written 500 at the top of the display of FIG. 3. If there are additional questions, a determination is made 502 as to whether the meter for the parameter of the next question is already on the display. If not, the appropriate meter is drawn 504.

FIG. 12 is a flowchart of the meter drawing procedure. This procedure not only draws the meter but also determines the appropriate color and the problem solving procedure for the brackets of the meter by following the branches of the tree until a terminal node having an associated color is encountered. This routine also inserts the actual value indicator 62 and accompanying data quality indication symbols.

First, a determination 512 is made as to whether the set points for this parameter change with sensor environment conditions. This determination can be made by examining the parameter change point flag in the current node record. If the answer to this is yes, another determination is made 514 as to whether or not the sensor environment conditions are adverse 514 using a similar flag in the current node record. If the sensor environment conditions are not adverse normal set points are retrieved 518 from the node record. Otherwise, adverse function set points are retrieved 516 from the node record. When the set points are determined, the appropriate brackets with appropriate colors can be overlaid 520 onto the meter background.

At this point, the appropriate indicator for data quality as well as current parameter value is overlaid or written into the meter image along with the digital values in the description section 76 below the meter 520. If all the brackets are assigned a color 522, the process terminates 534 and if all the brackets are not assigned a color a determination is made 524 as to whether the current value of the parameter is in the range of this bracket. If the answer is yes, the color associated with the current status is overlaid. If the parameter is not in the range of the particular bracket, a determination is made 528 as to whether additional questions nodes must be traversed to reach a terminal node to indicate the color of the bracket. If no additional questions are necessary, the color of the terminal node (status) is overlaid on the bracket 530. If additional questions must be answered, the nodes or records of the tree structure are traversed following the path, that would be active if the parameter crossed into the range of that bracket, using pointers until a terminus is reached at which the color of the bracket can be determined and overlaid.

Figure 13A:
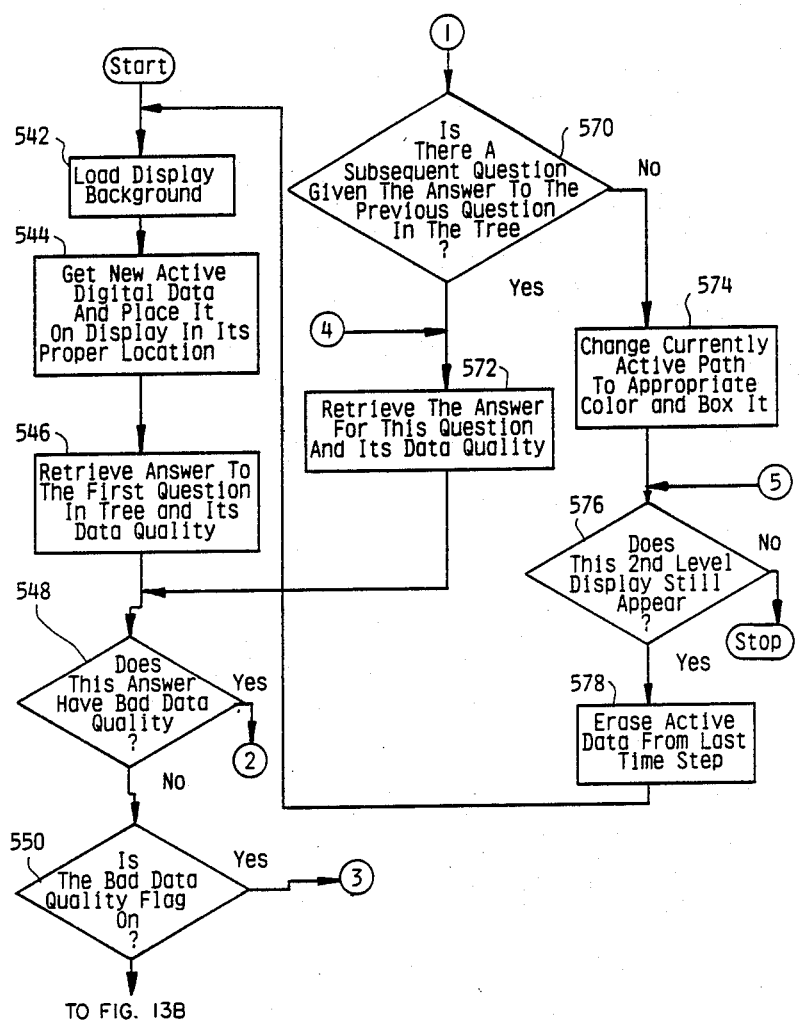
FIGS. 13A and 13B illustrate the flowchart for producing the second level status tree display.
Figure 13B:
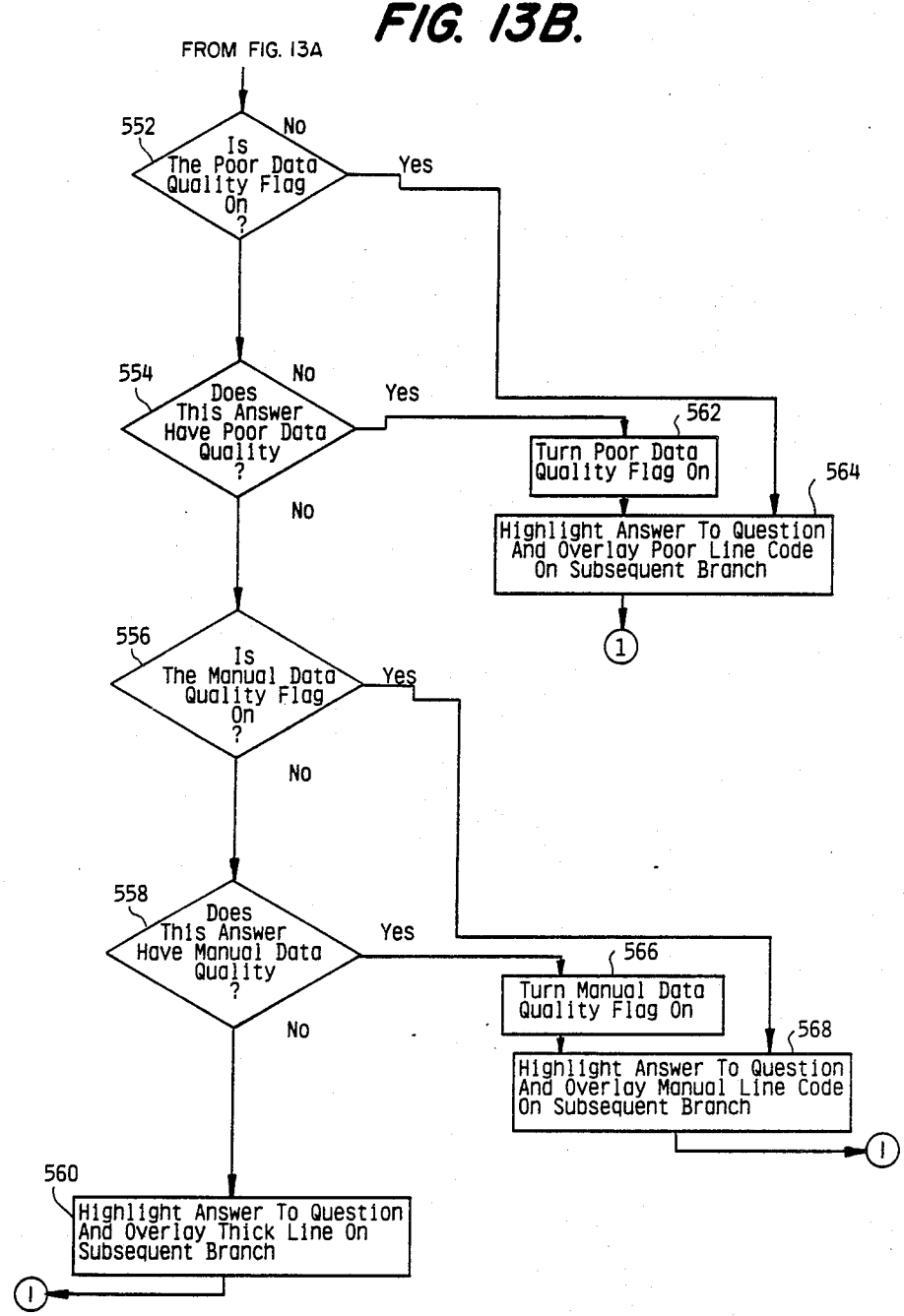
Figure 13C:
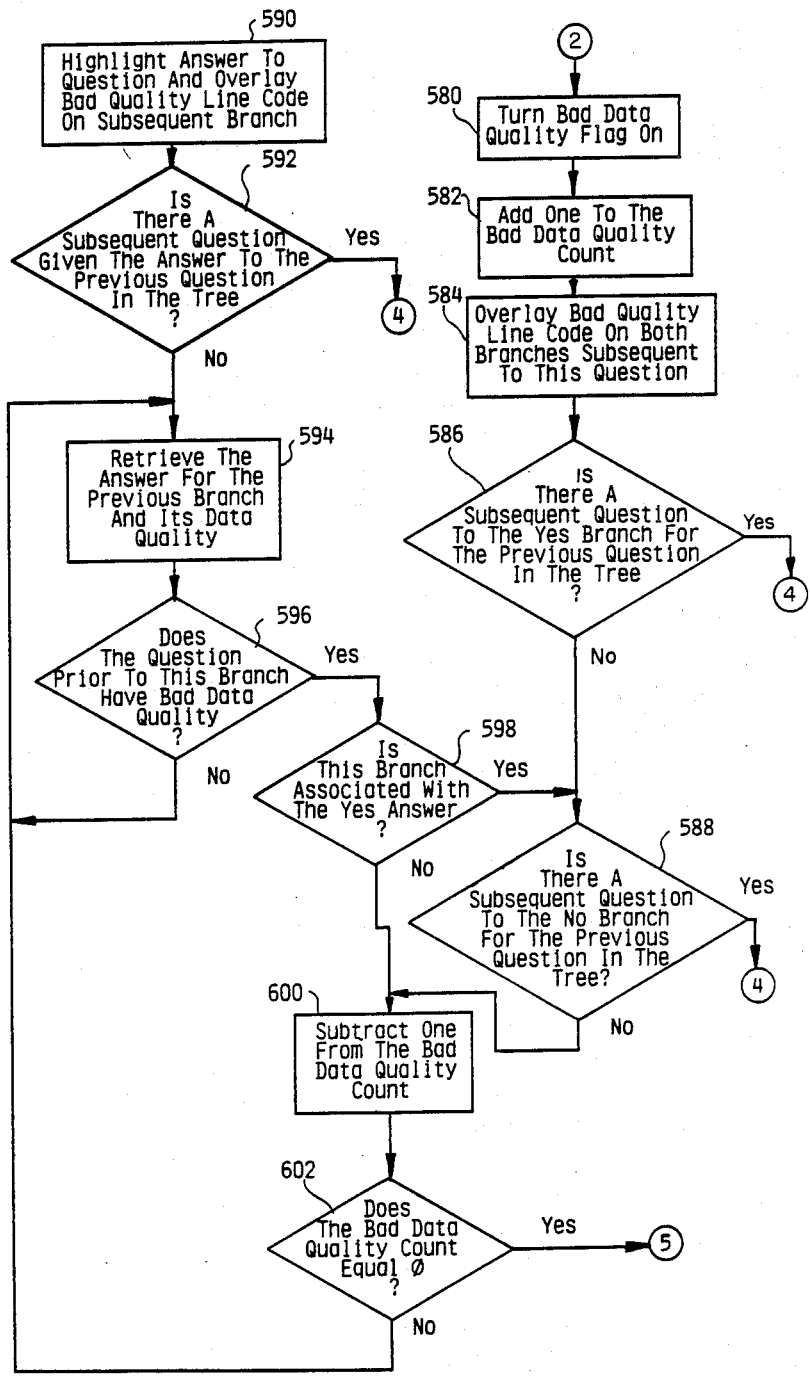

If the operator accesses the second level display for a particular critical function, a procedure in accordance with the flowchart of FIG. 13 is executed. This procedure simply loads the background into the display generator and then overlays the display with the active data at the proper locations.

First, the background for the display is loaded 542 which includes the decision node diagrams (the boxes and branches and terminal boxes) and the fixed text including procedure names and questions. Next, the active data for the parameter values are retrieved 544 and loaded into the appropriate variable value fields. The answer to the first question is retrieved 546 and decisions 548–558 are made as to the quality of the data. If the data is poor, a poor data flag 562 is turned on and the branch associated with the question answer is overlaid 564 with the poor question code as illustrated in FIG. 5. If the data is manual data, the manual data flag is turned on 566 and the appropriate manual data code is overlaid 568. If data quality for all data is good, the answer is highlighted and the subsequent branch is overlaid 560 with a thick or highlighted line.

If the data quality is not bad (that is, poor, manual, or good) a determination is made 570 as to whether there are subsequent questions in the tree by examining the node type indicator. If there are subsequent questions, the answer to this question is retrieved 572 along with its data quality and the loop for determining the appropriate data quality code, if any, is again executed. If there are no subsequent questions in the tree along the active path, the active path terminal box is turned 574 to the appropriate color. A determination is made 576 as to whether the second level display is still active and if so the current data is erased and the process is started again.

If the answer does have bad data quality, the bad data flag is turned on 580 and one is added to a bad data quality count. The bad data quality line code is overlaid 584 on the subsequent branch to this question. Next, an analysis is made 586 as to whether there are subsequent questions in the yes branch for the previous node. If the answer is no then a determination is made 588 as to whether there is a subsequent question in the no branch for the previous question. If the answer to the questions in boxes 586 and 588 is yes, the answer for the current question and data quality are retrieved 572.

If the bad data quality flag is on, the question answers are highlighted and the subsequent branch is overlaid 590 with the bad data quality code. Once again, a determination is made 592 as to whether there is a subsequent question in the tree. If there are no subsequent questions, then the answer for the previous branch and its data quality are retrieved 594 and a determination is made 596 as to whether the prior question has a bad data quality. If the answer is yes, then a determination is made as to whether this branch is associated with a yes answer. If not, one is subtracted 600 from the bad data quality count and a determination is made 602 as to whether the bad data quality count is equal to zero indicating that all branches of the tree have been processed. If the answer is yes, the system determines 576 whether the second level display is still active and recycles through the process.

Figure 14:
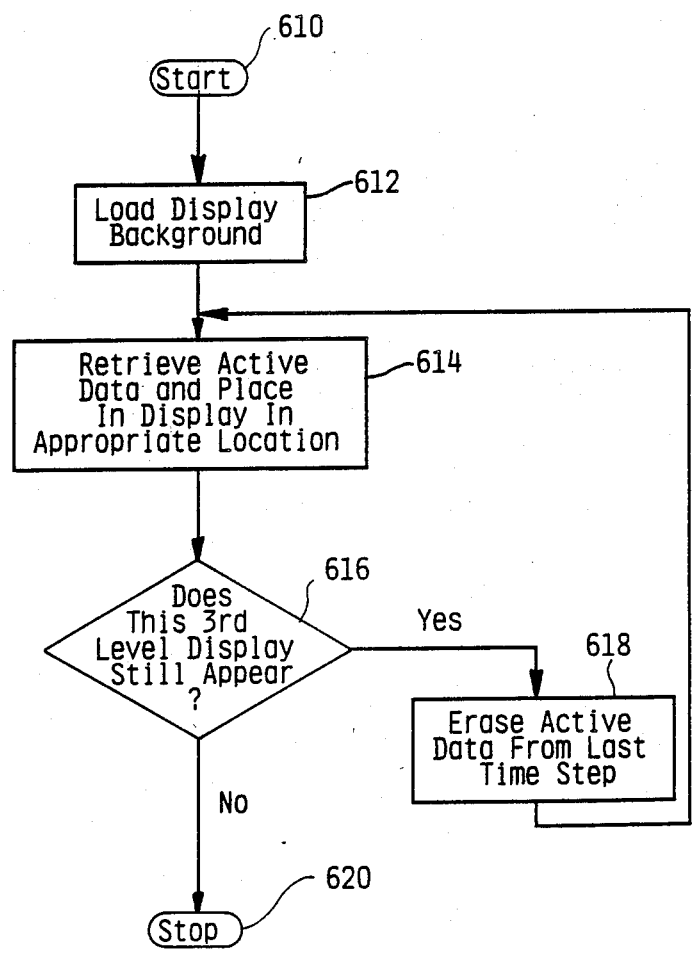
FIG. 14 depicts a flowchart for production of the third level sensor value display.

If the operator accesses the third level display, a procedure in accordance with FIG. 14 is executed. First, the background information for this display which includes the question, and the equation representations is loaded 612 into the display generator. Next, the active data for this function is retrieved and placed 614 in appropriate locations of the display. Then a determination is made 616 as to whether the third-level display is still active. If the third-level display is still active, the active data is erased 618 from the display and the process starts again.

Figure 15:
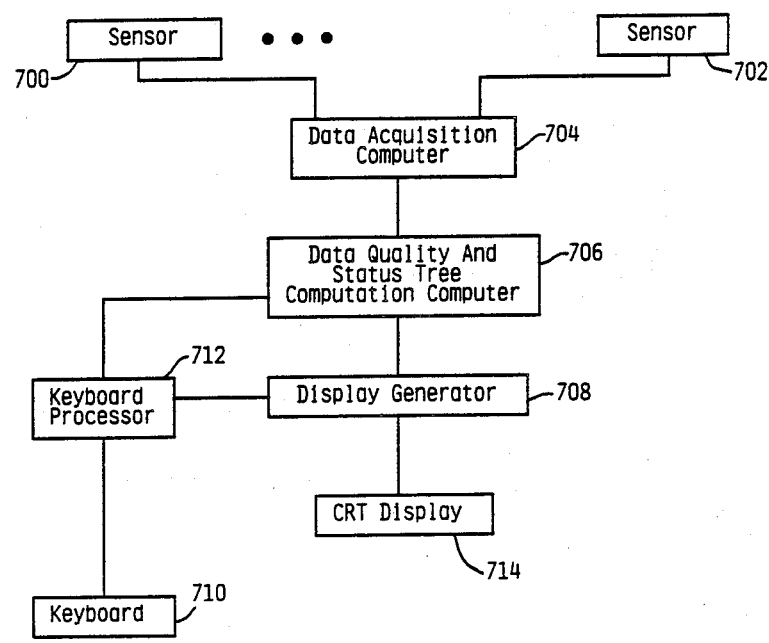
FIG. 15 illustrates an equipment configuration for performing the procedure of the present invention.

Many hardware configuration are appropriate for a system which processes and produces displays in accordance with the present invention. One preferred for a nuclear power plant is illustrated in FIG. 15. Sensors 700–702 are accessed by a data acquisition computer 704 such as a Gould concept 32 6750 series machine and the collected data is transferred to a data quality and status tree computation computer 706 which can also be a Gould concept 32 6750. This machine 706 performs the computations of FIGS. 8-14 and sends appropriate overlays to the display memory of a display generator 708 such as a Matrox display generator from Matrox Electronics Display Systems Model SX900. Typically, the display generator would store the background with the overlays being created by computer 706. A keyboard 17 is used by the operator to access both the computation computer 706 and display generator 708 through a keyboard processor such as an Intel 28610. The display generator produces an image on a CRT display such as the 8835 produced by Aydin. Other configurations are appropriate for executing the method of the present invention and consideration must be given to the cycle time required as well as the volume of data which must be gathered and analyzed.

The system of displays as previously described allows the operator to move through the displays to confirm the validity of the inputs to the system, the logic used to determine system status and the output status determined by the process control monitoring system and to thereby increase his confidence level in the validity of the output. This allows the process control monitoring system when operating at a high confidence level to positively contribute to correcting plant abnormalities. The system also allows the operator to monitor over all status while at the same time watch and anticipate status changes.

The many features and advantages of the present invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact structure, operation and method illustrated and described, and accordingly all suitable modifications and equivalents may be resorted to, falling within the scope of the invention.

What is claimed is:

1. A method of producing a discrete state status display for a process control system monitoring process control data, said method comprising the steps of:
   (a) sampling the process control data and determining discrete process control parameters;
   (b) producing a status display, indicating values of the discrete process control parameters, having a reference scale providing a plurality of parallel reference lines indicating the possible discrete values of the parameters, and at least two simultaneously displayed horizontal status bars transverse to the parallel lines, the bars centered in the scale, and each status bar representing the value of a respective discrete parameter and having a plurality of predetermined fixed sizes, each of the sizes dependent on the value of the parameter, a status bar name identifying the process represented by the status bar and a priority indicated vertically.

2. A method as recited in claim 1, wherein each status bar includes status wording in dependence on the parameter value.

3. A method as recited in claim 1, wherein said status display further comprises a data quality indicator spatially associated with each status bar indicating the quality of the process control data used to determine the parameter.

4. A method as recited in claim 1, wherein each status bar includes a bar color and a procedure name in dependence on the parameter value, the procedure name indicating a procedure performed by an operator in dependence on the parameter value.

5. A method as recited in claim 1, wherein said status display further comprises:
   a meter image spatially associated with said status bars and including an actual value indicator indicating an actual value of an item of the process control data and the quality of the item; and
   variable range brackets spatially associated with said meter image indicating ranges for the item actual value, the brackets having a color in dependence on the parameter value and including variable value range change threshold markers.

6. A method as recited in claim 5, further comprising the steps of:
   (c) producing an operator accessible status tree display comprising:
      a status tree for the process represented by said status bars and having a highlighted active path; and
      a miniature of said status display spatially associated with said status tree; and
   (d) producing an operator accessible parameter display comprising:
      a status tree node equation representation and sensor values; and
      a miniature of said status display spatially associated with said representation and said sensor values.

7. A method as recited in claim 1, wherein each bar has a color dependent on the parameter value.

8. A method of producing a discrete state status display for a pressurized water nuclear reactor control process, comprising the steps of:
   (a) sampling process control data and determining a discrete process parameter;
   (b) producing a status display indicating the discrete process parameter, the status display comprising:
      a status bar display, comprising
         a reference scale providing a plurality of parallel reference lines indicating the discrete values of the parameter;
         at least two simultaneously displayed horizontal status bars transverse to the parallel lines, the bars centered in said reference scale, each bar representing the value of a respective discrete parameter and having a plurality of fixed sizes, each of the sizes dependent on the value of the parameter, each bar each having a color, status wording and a procedure name in dependence upon the parameter value, the procedure name indicating a procedure performed by an operator in dependence on the parameter value, and having a status bar name identifying the process represented by the status bar and a priority indicated vertically; and
         a data quality indicator spatially associated with each status bar indicating the quality of the process control data; and
      an item meter display, comprising:
         a meter image spatially associated with said status bar display and including an actual value indicator indicating an actual value of an item of the process control data and the quality of the item; and
         variable range brackets spatially associated with said meter image indicating ranges for the actual value, the brackets having a color in dependence on the parameter value and including variable value range change threshold markers;
   (c) producing an operator accessible status tree display, comprising:
      a status tree for the process represented by said status bar and having a highlighted active path; and
      a miniature of said status bar display spatially associated with said status tree; and
   (d) producing an operator accessible parameter display, comprising:
      a status tree node equation representation and sensor values; and
      a miniature of said status bar display spatially associated with said representation and said sensor values.

9. An apparatus for producing a discrete state display for a process control system monitoring process control data, said apparatus comprising:
   data acquisition and status tree computation means for sampling the process control data, determining discrete process control parameters and creating a first display in dependence on the parameters;
   display means for displaying the first display, said first display comprising a reference scale providing a plurality of parallel reference lines indicating the possible discrete values of the parameters, and at least two simultaneously displayed horizontal status bars transverse to the parallel lines, the bars centered in the reference scale, and each status bar representing the value of a respective discrete parameter and having a plurality of fixed sizes, each of the sizes dependent on the value of the parameter, a status bar name identifying the process represented by the status bar and a priority indicated vertically.

10. An apparatus as recited in claim 9, wherein each status bar includes status wording in dependence on the parameter value.

11. An apparatus as recited in claim 9, wherein said first display further comprises a data quality indicator spatially associated with each status bar indicating the quality of the process control data used to determine the parameter.

12. An apparatus as recited in claim 9, wherein each status bar includes a bar color and a procedure name in dependence on the parameter value, the procedure name indicating a procedure performed by an operator in dependence on the parameter value.

13. An apparatus as recited in claim 9, wherein said first display further comprises:
   a meter image spatially associated with said status bar and including an actual value indicator indicating an actual value of an item of the process control data and the quality of the item; and
   variable range brackets spatially associated with said meter image indicating ranges for the actual value, the brackets having a color in dependence on the parameter value indicated and including variable value range change threshold markers.

14. An apparatus as recited in claim 9, wherein said data acquisition and status tree computation means creates a second display and said display means displays the second display comprising:
- a status tree for the process represented by said status bar and having a highlighted active path; and
- a miniature of said first display spatially associated with said status tree.

15. An apparatus as recited in claim 14, wherein said data acquisition and status tree computation means creates a third display and said display means displays the third display comprising:
- a status tree node equation representation and sensor values; and
- a miniature of said first display spatially associated with said representation and said sensor values.

16. An apparatus as recited in claim 9, wherein each bar has a color dependent on the parameter value.

17. An apparatus for producing a discrete state display for a pressurized water nuclear reactor process, comprising:
- data acquisition and status tree computation means for sampling process control data, determining a value of a discrete process parameter and creating first through third accessible displays in dependence on the parameter value; and
- display means for displaying the first through third displays independence upon the parameter and an operator request, said first display comprising:
  - a reference scale providing a plurality of parallel reference lines indicating the discrete values of the parameters;
  - at least two simultaneously displayed horizontal status bars transverse to the parallel lines, the bars centered in said reference scale, each bar representing the value of a respective discrete parameter and having a plurality of fixed sizes, each of the sizes dependent on the value of the parameter, each bar having a color, status wording and a procedure name in dependence upon the parameter value, the procedure name indicating a procedure performed by the operator in dependence on the parameter value, and having a status bar name identifying the process represented by the status bar and a priority indicated vertically;
  - a data quality indicator spatially associated with each status bar indicating the quality of the process control data;
  - a meter image spatially associated with status bars and including an actual value indicator indicating an actual value of an item of the process control data and the quality of the item; and
  - variable range brackets spatially associated with said meter image indicating ranges for the actual value, the brackets having a color in dependence on the parameter value indicated thereby and including variable value range change threshold markers;
- said second display comprising:
  - a status tree for said status bars and having a highlighted active path;
  - a miniature of said first display spatially associated with said status tree; and
- said third display comprising:
  - a status tree node equation representation and sensor values; and
  - a miniature of said first display spatially associated with said representation and said sensor values.

18. A display group for a process control system monitoring process control data which determines discrete process parameters, said display group comprising:
- a first display comprising a reference scale providing a plurality of parallel reference lines indicating the possible discrete values of the parameters, and at least two simultaneously displayed horizontal status bars transverse to the parallel lines, the bars centered in the reference scale, and each status bar representing value of a respective discrete parameter and having a plurality of fixed sizes, each size dependent on the value of the parameter, a status bar name identifying the process represented by the status bar and a priority indicated vertically; and
- second and third displays accessible from said first display.

19. A display group as recited in claim 18, wherein each bar has a color dependent on the parameter value.

20. A display group as recited in claim 18, wherein each status bar includes status wording in dependence on the parameter value.

21. A display group as recited in claim 18, wherein said first display further comprises a data quality indicator spatially associated with each status bar indicating the quality of the process control data used to determine the parameter value.

22. A display group as recited in claim 18, wherein each status bar includes a bar color and a procedure name in dependence on the parameter value, the procedure name indicating a procedure performed by an operator in dependence on the parameter value.

23. A display group as recited in claim 18, wherein said first display further comprises:
- a meter image spatially associated with said status bars and including an actual value indicator indicating an actual value of an item of the process control data and the quality of the item; and
- variable range brackets spatially associated with said meter image indicating ranges for the actual value, the brackets having a color in dependence on the parameter value and including variable value range change threshold markers.

24. A display group as recited in claim 18, wherein said second display comprises:
- a status tree for said status bar and having a highlighted active path; and
- a miniature of said first display spatially associated with said status tree.

25. A display group as recited in claim 18, wherein said third display comprises:
- a status tree node equation representation and sensor values; and
- a miniature of said first display spatially associated with said representation and said sensor values.

26. A display group for a pressurized water nuclear reactor control system monitoring process control data and which determines discrete process parameters, said display group comprising:
- a first display, comprising:
  - a reference scale providing a plurality of parallel reference lines indicating the discrete values of the parameters;
  - at least two simultaneously displayed horizontal status bars transverse to the parallel lines, the bars centered in said reference scale, each bar representing the value of a respective discrete parameter and having a plurality of predetermined fixed sizes, each size dependent in the value of the parameter, each bar having a color, status wording and a procedure name in dependence upon the parameter value, the procedure name indicating a procedure performed by an operator in dependence on the parameter value, and having a status bar name identifying the process represented by the status bar and a priority indicated vertically; and a data quality indicator spatially associated with each status bar indicating the quality of the process control data;

a meter image spatially associated with said status bars and including an actual value indicator indicating an actual value of a portion of the process control data and data quality; and variable range brackets spatially associated with said meter image indicating ranges for the actual value, the brackets having a color in dependence on the parameter value and including variable value range change threshold markers;

a second display comprising:
   a status tree for said status bar and having a highlighted active path; and
   a miniature of said first display spatially associated with said status tree; and a third display comprising
   a status tree node equation representation and sensor values; and
   a miniature of said first display spatially associated with said representation and said values.

* * * * *